United States Patent [19]

Cain et al.

[11] Patent Number: 5,036,323

[45] Date of Patent: Jul. 30, 1991

[54] ACTIVE RADAR STEALTH DEVICE

[75] Inventors: R. Neal Cain, Fredericksburg; Albert J. Corda, Dahlgren, both of Va.

[73] Assignee: The United States of America as represented by the Secretary of the Navy, Washington, D.C.

[21] Appl. No.: 583,624

[22] Filed: Sep. 17, 1990

[51] Int. Cl.[5] .......................... G01S 7/38; H01Q 15/00
[52] U.S. Cl. .......................................... 342/6; 342/13; 342/15
[58] Field of Search .................... 342/6, 13, 14, 15, 1, 342/2, 3, 4, 5, 16

[56] References Cited

U.S. PATENT DOCUMENTS

| | | | |
|---|---|---|---|
| 2,989,744 | 6/1961 | Pettit | 342/15 |
| 3,007,159 | 10/1961 | Dodington | 342/15 |
| 3,568,194 | 3/1971 | Wilson et al. | 342/6 |
| 3,623,091 | 11/1971 | Mayo, Jr. et al. | 342/6 |
| 3,866,225 | 2/1975 | Buck | 342/15 |
| 4,117,485 | 9/1978 | Gorr et al. | 342/6 |
| 4,143,263 | 3/1979 | Eichweber | 342/6 X |
| 4,314,249 | 2/1982 | Onoe | 342/6 |
| 4,419,669 | 12/1983 | Slager et al. | 342/6 |
| 4,613,863 | 9/1986 | Mitchell | 342/172 |
| 4,647,930 | 3/1987 | Carof et al. | 342/6 |
| 4,684,952 | 8/1987 | Munson et al. | 343/700 MS |
| 4,811,308 | 3/1989 | Michel | 367/136 |
| 4,816,832 | 2/1989 | Gold et al. | 342/14 |

Primary Examiner—John B. Sotomayor
Attorney, Agent, or Firm—John D. Lewis; Kenneth E. Walden

[57] ABSTRACT

An active radar stealth device mounted on a host platform for minimizing the radar cross-section of the host platform. A coating which is essentially microwave transparent is attached to the surface of a host platform and is exposed to an incident microwave field. A plurality of detector/emitter pairs contained within the coating detect and actively cancel, respectively, the microwave field at each respective detector/emitter pair.

11 Claims, 1 Drawing Sheet

ACTIVE RADAR STEALTH DEVICE

ORIGIN OF THE INVENTION

The invention described herein was made in the performance of official duties by employees of the Department of the Navy and may be manufactured, used, licensed by or for the Government for any governmental purpose without payment of any royalties thereon or therefore.

FIELD OF THE INVENTION

This invention relates generally to radar stealth and in particular to an active radar stealth device.

BACKGROUND OF THE INVENTION

Stealth, as it applies to radar systems, refers to the minimization of one's radar cross-section. Currently, most stealth systems in development or production are based upon passive, or absorptive approaches, where specialized structural design methods are combined with the use of microwave absorptive coatings. Although success has been achieved with this method, there are still a great deal of problems. Often, the structural design having the smallest radar cross-section will not be the most efficient aerodynamic design, thereby diminishing the performance characteristics of the aircraft. Similarly, while structural design methods are effective in reducing the cross-section of relatively small systems such as an aircraft, they become impractical when attempting to reduce the radar cross-section of something significantly larger and more geometrically complicated, such as a ship. Furthermore, there can still be a significant amount of RF energy reflected from the absorptive coatings.

An active radar stealth technique, known as electronic counter measure (ECM), involves active manipulation of RF signals. However, current systems are limited by the physical properties of metallic based antennae and structures. In these systems the incoming RF signal will be reflected from the metallic skin of the aircraft/ship before an active device on the aircraft/ship can modify the signal and manipulate it or repeat it back to the source. Thus, there is no opportunity for stealth, although there can be cover and deception.

SUMMARY OF THE INVENTION

Accordingly, it is an object of the present invention to provide a radar stealth device that minimizes the radar cross-section of any object under radar surveillance.

It is a further object of the present invention to provide a radar stealth device that permits an efficient functional design while providing the advantages of stealth protection.

Other objects and advantages of the present invention will become more apparent hereinafter in the specifications and drawings.

In accordance with the present invention, an active radar stealth device, mounted on a host platform, minimizes the radar cross-section of the host platform. A plastic coating, practically transparent with respect to an incident microwave field, is provided on the surface on the host platform. The incident microwave field passes through the coating and reflects off the host platform to form a reflected microwave field. A microwave detector is contained within the coating and detects a combination of the incident microwave field, the reflected microwave field, and a canceling microwave field. A microwave emitter adjacent to the microwave detector and contained within the coating produces the canceling microwave field in response to the detected combination. The canceling microwave field is a microwave field that is 180° out of phase with respect to the detected combination in order to provide a theoretical radar cross-section approaching zero at the microwave detector.

DETAILED DESCRIPTION OF THE INVENTION

Figure 1:
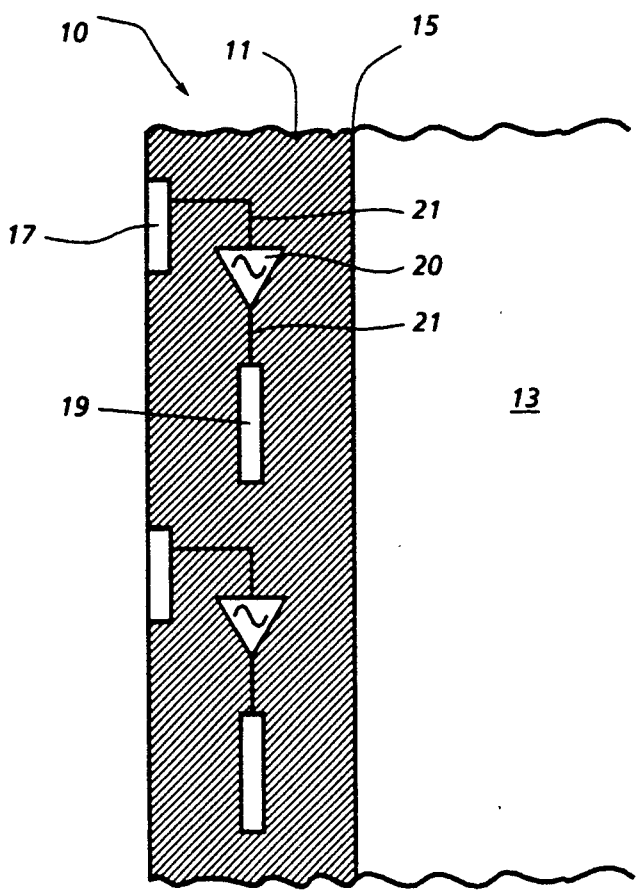
FIG. 1 is a cross-sectional view of the active radar stealth device according to the present invention.

Microwave radiation generally refers to radiation residing above 1 GHz in the radiation spectrum. This would include many types of radar systems such as L-, S-, C-, X-, K-, Ku- and Ka-bands as well as the experimental microwave bands up to and beyond 300 GHz. The present invention is designed to be operational in any and all of these frequencies. Referring now to the drawings, and in particular to FIG. 1, an active radar stealth device 10 according to the present invention is shown exposed to an incident microwave field 30. The device 10 consists of a coating 11 on a surface 15 of a host platform 13. For ease of description host platform 13 is shown only in section and may be the outer surface of any object under radar surveillance. Typically, host platform 13 is an aircraft, ship or other vehicle. The choice of material for and shape of host platform 13 is not a design constraint of the present invention. Indeed, this is one of the great advantages of the present invention since the design of host platform 13 is independent of stealth considerations and may therefore be optimized for its specific purpose.

The coating 11 is a microwave field semi-transparent coating attached to the surface 15 of host platform 13. Attachment must be effected by the use of an epoxy glue, or it may be heat-sealed directly to the surface 15. Indeed, any attachment mechanism may be used as long as the affect on microwave fields reflected from the surface 15 is minimal and uniform. While the surface 15 is shown as being flat, it is not so limited. Indeed, another advantage of the present invention is its ability to provide stealth regardless of the host platforms surface contours. Ideally, coating 11 would have a coefficient of transmission of 1 and coefficient of reflection of 0 in order to be essentially transparent with respect to the microwave fields. Typically, coating 11 is a plastic composite. Other materials may be chosen for coating 11 depending on such design constraints as the expected radar environment, cost, ability of the material to adapt to the particular shape of the host platform surface 15, etc.

Mounted within coating 11 are a microwave detector 17 and a microwave emitter 19 rigidly held in a spaced apart relationship with one another by coating 11. Both detector 17 and emitter 19 are typically constructed as an "RF conductive patch" and deposited on a thin-film material. They should also have a small radar cross-section with respect to the surface 15 of host platform 13.

For example, if host platform 13 is an aircraft or ship made of metal or metal alloys, detector 17 and emitter 19 might be thin-film piezoelectric plastic patches. While detector 17 is shown to be exposed directly to the incident microwave field 30, its placement is not limited thereto. Detector 17 may also be located completely within coating 11. The location relationship between detector 17 and emitter 19 will be discussed further herein below.

For ease of description, the present invention will be described for a single detector/emitter pair 17/19. However, in practice, the present invention will make use of a plurality of these pairs throughout the coating 11. Since each pair functions independently and in identical fashion, a functional description of the present invention will be provided by reference to the single detector/emitter pair 17/19.

A phase inverting amplifier 20 is connected between detector 17 and emitter 19. While amplifier 20 and associated wiring 21 is shown to reside totally within coating 11, the invention is not so limited. For example, amplifier 20 might be located inside the host platform 13 or may even be integrated into one or both of detector 17 or emitter 19. The microwave field, which will be described in greater detail herein below, detected by detector 17, is inverted by amplifier 20 to be 180° out of phase with respect to the detected field. In turn, emitter 19 propagates the phase inverted field out into the coating 11 to cancel the detected microwave field. Alternatively, amplifier 20 might be any signal modifying amplifier depending on the desired type of canceling microwave field. For example, amplifier 20 might be a multiplier in which case emitter 19 would propagate a microwave field much greater than that detected by detector 17. In such an operational mode, the present invention would provide deception and cover.

Figure 2:
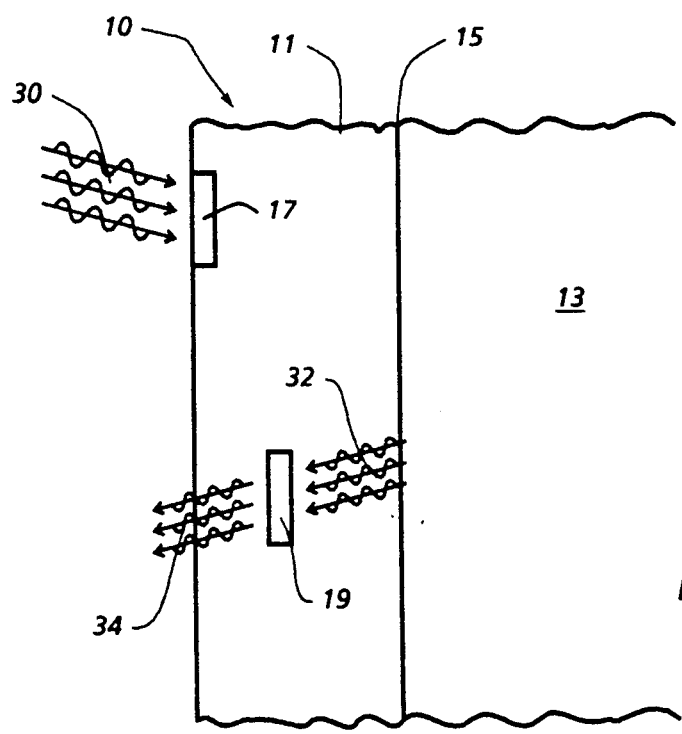
FIG. 2 is a cross-sectional view of the active radar stealth device according to the present invention showing the incident microwave field, reflected microwave field and canceling microwave field.

In operation, the microwave field detected by detector 17 is a combination of three microwave fields. Referring now to FIG. 2, amplifier 20 and its associated wiring 21 have been removed for ease of description. Detector 17 detects a combination of incident microwave field 30, reflected microwave field 32 and canceling microwave field 34. Reflected microwave field 32 is the reflection of incident microwave field 30 off host platform 13. Canceling microwave field 34 is the canceling microwave field produced at emitter 19 and is 180° out of phase with respect to the detected combination at detector 17. Thus, the canceling microwave field 34 is also a feedback input detected by detector 17 and is used to cancel the microwave field at detector 17.

In order to have the canceling microwave field 34 cancel the combined microwave field at detector 17, it is necessary to offset emitter 19 from detector 17 with respect to their relationship to the host platform 13. In particular, detector 17 must be further from host platform 13 in order to receive incident microwave field 30 before canceling microwave 34 is emitted. The exact spacing is a design consideration based upon the dielectric constant of the coating processing speed of amplifier 20, expected radar environment, etc. Separation between detector 17 and emitter 19 in the horizontal and vertical directions of FIGS. and 2 is typically on the order of millimeters.

The advantages of the present invention are numerous. The active radar stealth device provides stealth protection for any host platform regardless of the shape and size of the platform. The present invention adapts to any changing incident microwave fields since each detector/emitter pair functions independently to cancel out the microwave field at that pair. In addition, the design of the present invention could be easily adapted to generate a microwave field at emitter 19 that would modify the detected combination in any fashion. This would provide the added capability of modifying the microwave radiation response of the host platform as desired.

In another aspect of the present invention, the active radar stealth device might be combined with one of the passive/absorptive approaches. The resulting system would consist of two layers, an inner layer being a passive/absorptive material and an outer layer consisting the active radar stealth device of the present invention.

Thus, although the invention has been described relative to specific embodiments thereof, it is not so limited and numerous variations and modifications thereof will be readily apparent to those skilled in the art in light of the above teaching. It is therefore to be understood that within the scope of the appended claims the invention may be practiced otherwise than as specifically described. What is claimed is:

We claim:

1. An active radar stealth device mounted on a host platform for minimizing the radar cross-section of the host platform, comprising:
   a. a coating on a surface of the host platform wherein said coating is essentially transparent with respect to a microwave field incident on said coating, said incident microwave field passing through said coating and reflecting off the host platform to form a reflected microwave field;
   b. means contained within said coating for detecting a combination of: (1) said incident microwave field, (2) said reflected microwave field and (3) a canceling microwave field; and
   c. means contained within said coating for producing said canceling microwave field in response to said detected combination.

2. An active radar stealth device as in claim 1 wherein said detecting means is exposed to said incident microwave field at a surface of said coating.

3. An active radar stealth device as in claim 1 wherein said detecting means is located further from the host platform than said producing means.

4. An active radar stealth device as in claim 1 wherein said coating is plastic.

5. A device mounted on a host platform for modifying a microwave radiation response of the host platform comprising:
   a. a coating on a surface of the host platform wherein said coating is practically transparent with respect to a microwave field incident on said coating, said incident microwave field passing through said coating and reflecting off the host platform to form a reflected microwave field;
   b. at least one microwave detector contained within said coating for detecting a combination of: (1) said incident microwave field, (2) said reflective microwave field and (3) a modifying microwave field at said detector;
   c. means, in electronic communication with each of said detectors, for producing a control signal in response to said detected combination; and
   d. at least one microwave emitter contained within said coating wherein said emitter is adjacent to said detector to form a detector/emitter pair, said emitter producing said modifying microwave field in response to said control signal wherein said modifying microwave field modifies the microwave radiation response of the host platform at said detector.

6. A device as in claim 5 wherein said coating is plastic.

7. A device as in claim 5 wherein said microwave detector and microwave emitter comprise piezoelectric plastic.

8. A device as in claim 5 wherein said detector is located further from the host platform than said paired emitter.

9. A device as in claim 5 wherein said control signal means is a phase inverting amplifier whereby said modifying microwave field produced by said emitter is 180° out of phase with respect to said detected combination.

10. A device as in claim 5 wherein said detector is exposed to said incident microwave field at a surface of said coating.

11. A device as in claim 5 wherein said control signal means is a multiplier.

* * * * *